United States Patent [19]
Van Vleet

[11] Patent Number: 5,704,201
[45] Date of Patent: Jan. 6, 1998

[54] IMPLEMENT CARRIER AND METHOD FOR USING

[76] Inventor: Robert D. Van Vleet, 405 12th St., Sidney, Nebr. 69162

[21] Appl. No.: 548,216

[22] Filed: Oct. 25, 1995

[51] Int. Cl.$^6$ ................................................ A01D 38/86
[52] U.S. Cl. .................................. 56/14.9; 56/6; 56/15.2
[58] Field of Search ........................ 56/6, 13.3, 13.5, 56/13.6, 14.5, 14.7, 14.9, 15.2, 15.8, 15.9, 16.9, 16.6, 233, 202, 320.2

[56] References Cited

U.S. PATENT DOCUMENTS

| | | |
|---|---|---|
| 2,833,102 | 5/1958 | Roof . |
| 3,045,413 | 7/1962 | Sheffer . |
| 3,208,207 | 9/1965 | Bottenberg ........................ 56/14.9 X |
| 3,241,302 | 3/1966 | Barry . |
| 3,638,406 | 2/1972 | Scherer et al. . |
| 3,757,500 | 9/1973 | Averitt . |
| 3,969,856 | 7/1976 | Zerrer . |
| 4,024,695 | 5/1977 | Haseloff . |
| 4,689,940 | 9/1987 | Skovhoj . |
| 4,802,327 | 2/1989 | Roberts . |
| 4,840,020 | 6/1989 | Oka ..................................... 56/6 X |
| 4,901,508 | 2/1990 | Whatley . |
| 5,060,463 | 10/1991 | Jones . |
| 5,065,568 | 11/1991 | Braun et al. ........................... 56/14.9 |
| 5,109,655 | 5/1992 | Tekulve ................................... 56/6 |
| 5,303,532 | 4/1994 | Phillips . |
| 5,408,814 | 4/1995 | Milbourn . |
| 5,475,971 | 12/1995 | Good et al. ............................ 56/14.9 |

*Primary Examiner*—Terry Lee Melius
*Assistant Examiner*—Robert Pezzuto
*Attorney, Agent, or Firm*—Merchant, Gould, Smith, Edell, Welter & Schmidt, P.A.

[57] ABSTRACT

An implement carrier for mounting implements such as mower blades, spreader blades, tiller blades or nozzles. The implement carrier includes a deck pivotal about a pivot axis that is generally perpendicular to the deck. The deck defines a slot having an open end and a closed end. The closed end of the slot preferably circumscribes the pivot axis of the deck and the open end of the slot preferably is located at the outer perimeter of the deck. The implement carrier is operable for receiving an obstacle in the slot and pivoting about the obstacle such that the deck can by-pass the obstacle.

11 Claims, 12 Drawing Sheets

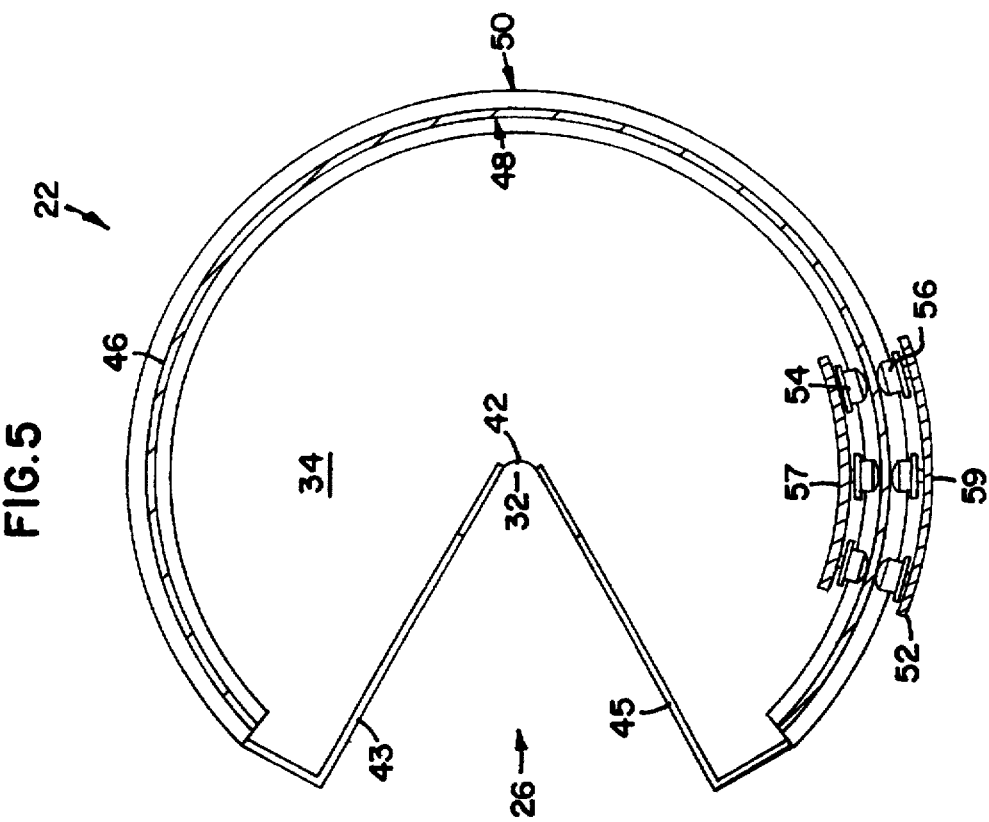
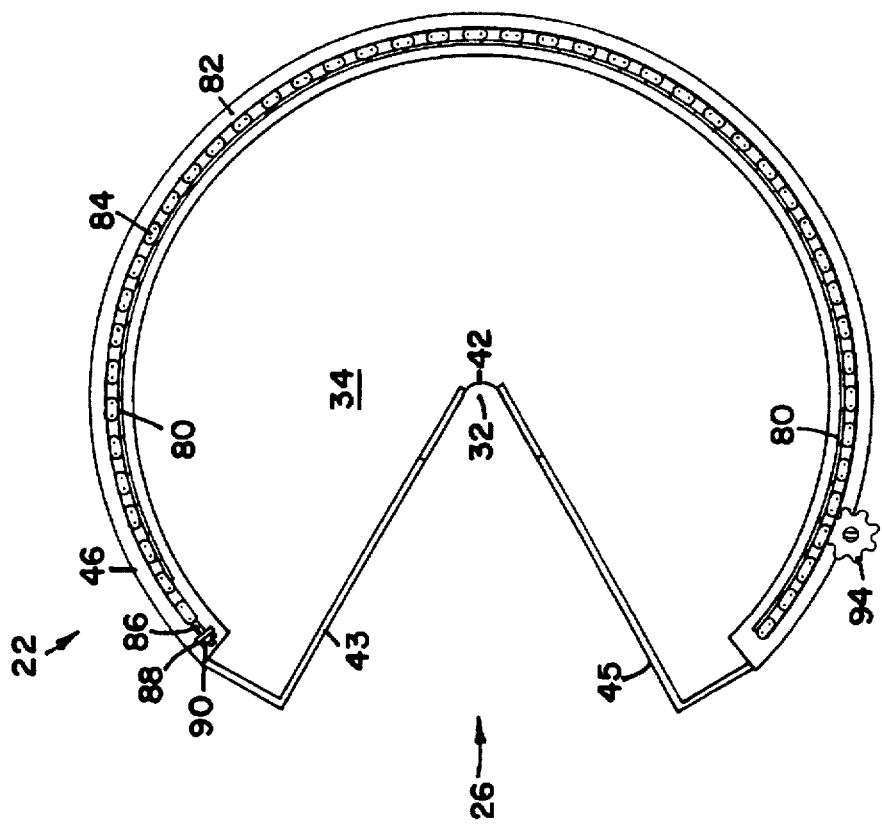

IMPLEMENT CARRIER AND METHOD FOR USING

FIELD OF THE INVENTION

The present invention relates generally to implement carriers. Specifically, the present invention relates to agricultural devices such as mowers and tillers.

BACKGROUND OF THE INVENTION

Obstacles such as sign posts, fence posts and small trees present a significant problem to road side mower operators. Road side mowing is typically done with vehicle mounted mowers. In order to mow around an obstacle with a conventional vehicle mounted mower, it is necessary for the operator to make multiple direction changes. The other alternative is to use hand held or push mowers to cut around the obstacles. Due to the large number of obstacles located along a typical road way, the cost of individually mowing around each obstacle using conventional mowing techniques is prohibitive. Therefore, the grass around obstacles is commonly left uncut. At best, the patches of uncut grass surrounding obstacles are unattractive. At worst, the uncut grass presents a safety hazard by interfering with driver visibility.

SUMMARY OF THE INVENTION

The present invention relates generally to an implement carrier including a deck pivotal about a pivot axis that is generally perpendicular to the deck. The deck preferably includes a slot having an open end and a closed end. The closed end of the slot preferably circumscribes the pivot axis of the deck and the open end of the slot preferably is located at the outer perimeter of the deck. The implement carrier also preferably includes structure for connecting the deck to a vehicle. Additionally, the implement carrier includes a drive mechanism for selectively pivoting the deck about the pivot axis.

In operation, the implement carrier is moved by the vehicle toward an obstacle such that the obstacle is received in the slot of the implement carrier deck. The implement carrier is advanced until the obstacle is aligned with the pivot axis of the deck. Then, an operator causes the drive mechanism to pivot the deck approximately 180 degrees about the obstacle, thereby enabling the deck to bypass the obstacle without altering the travel direction of the vehicle.

It will be appreciated that the implement carrier of the present invention may be used to carry a variety of implements such as tiller blades, spreader blades, mower blades, and sprayers. It is preferred for mower blades to be pivotally mounted along the bottom of the deck of the implement carrier. The resulting mower is able to closely mow completely around an obstacle without requiring an operator of the mower to change directions. This allows mower operators to quickly and easily mow around obstacles such as sign posts, fence posts and small trees.

A variety of additional advantages of the invention will be set forth in part in the description which follows, and in part will be obvious from the description, or may be learned by practice of the invention. The advantages of the invention will be realized and attained by means of the elements and combinations particularly pointed out in the claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. A brief description of the drawings is as follows:

FIG. 5 is a cross-sectional view cut along a horizontal plane extending through the guide rail of the implement carrier of FIGS. 1 and 2, the cross-section illustrates how idler pulleys of the implement carrier straddle the web of the guide rail;

FIG. 6 is a cross-sectional view cut along a horizontal plane extending through the top of a chain mounting flange of the implement carrier of FIGS. 1 and 2, the cross-section illustrates how a chain is mounted on the implement carrier and how a gear cooperates with the chain to rotate the implement carrier.

DETAILED DESCRIPTION OF THE INVENTION

Reference will now be made in detail to exemplary embodiments of the present invention which are illustrated in the accompanying drawings. Wherever possible, the same reference numbers will be used throughout the drawings to refer to the same or like parts.

Figure 1:
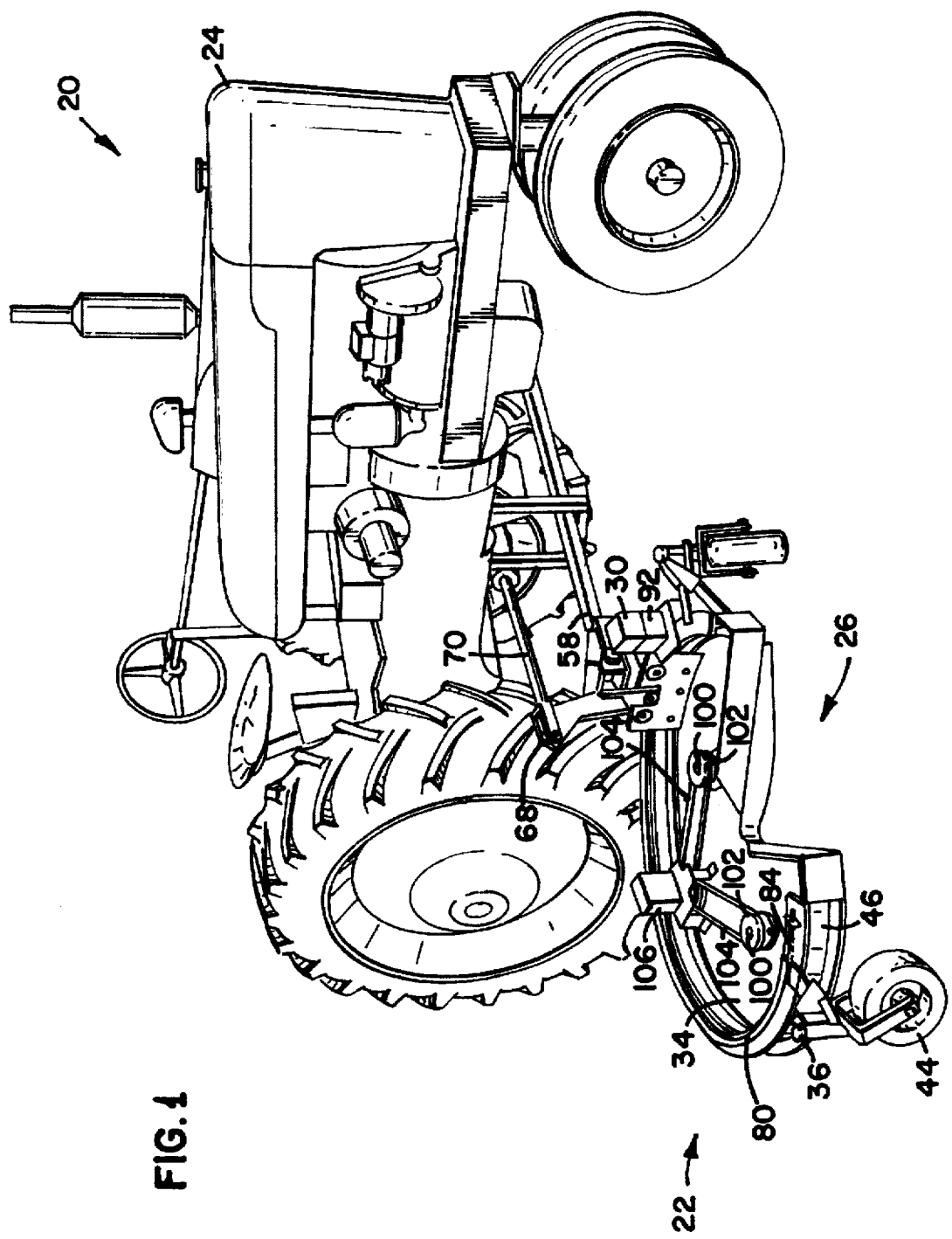
FIG. 1 is a perspective view of a mower constructed in accordance with the principles of the present invention, the mower includes an implement carrier oriented in an operating position.
Figure 2:
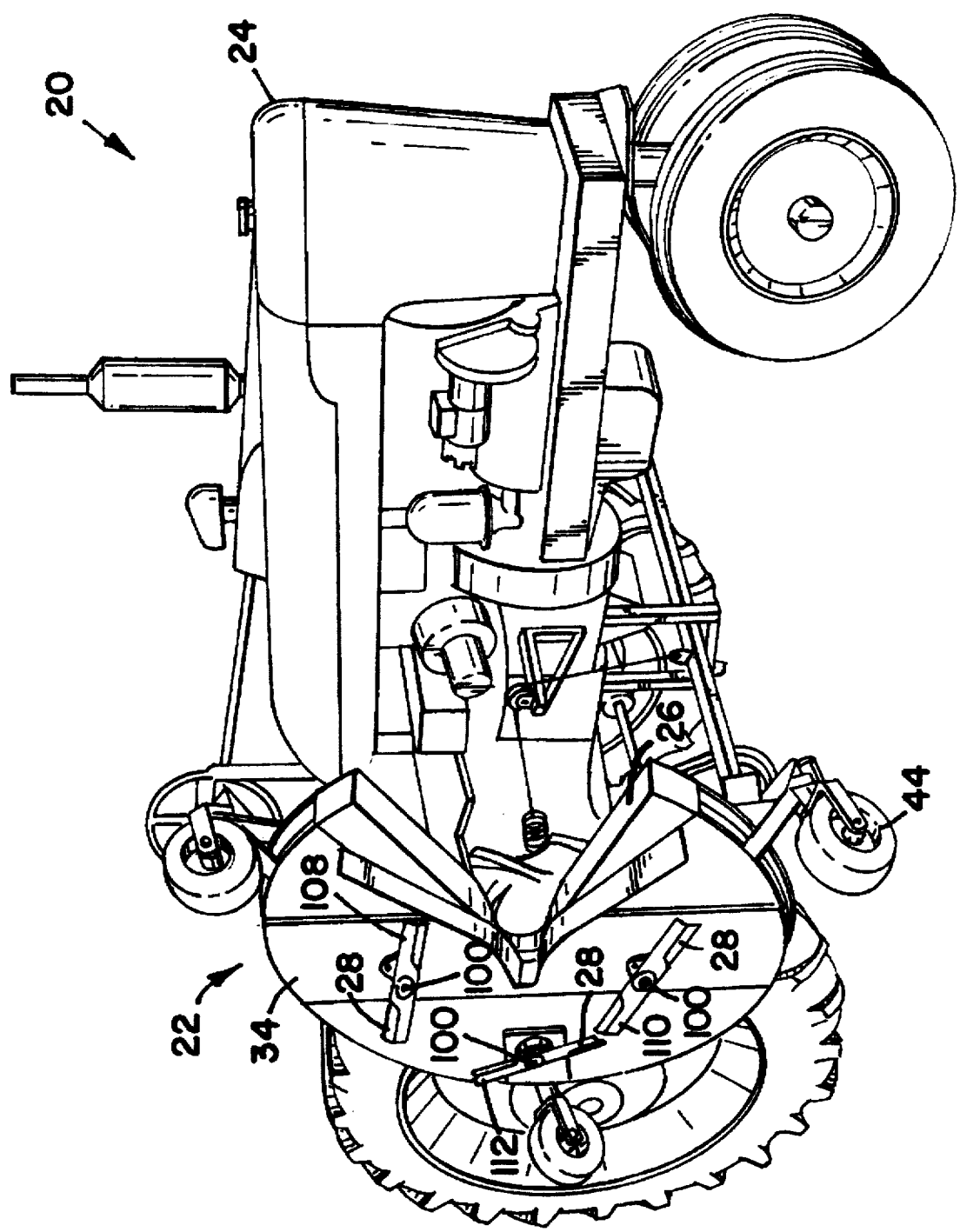
FIG. 2 shows the mower of FIG. 1 with the implement carrier oriented in a stowed position.

FIGS. 1 and 2 show a mower 20 constructed in accordance with the principles of the present invention. The mower 20 includes an implement carrier 22 that is preferably mounted on a tractor 24. The implement carrier 22 includes a deck 34 that defines a slot 26 for receiving obstacles such as sign posts, fence posts and small tress. A plurality of mower blades 28 are preferably mounted on the bottom of the deck 34. A drive mechanism 30 preferably cooperates with the deck 34 for selectively pivoting the deck 34 about a pivot axis 32 (best shown in FIGS. 7A–7G) that is generally perpendicular to the deck 34 and that passes through the slot 26.

In general operation, the tractor 24 advances the implement carrier 22 toward an obstacle such that the obstacle is received in the slot 26 and aligned with the pivot axis 32. Once the obstacle is aligned with the pivot axis 32, an operator of the mower 20 starts the drive mechanism 30 causing the deck 34 to pivot about the pivot axis 32. As the deck 34 is pivoted about the axis 32, the mower 20 mows completely around the obstacle without requiring the operator of the tractor 24 to change directions.

The deck 34 of the implement carrier 22 is preferably made of steel and preferably has a circular outer perimeter.

Figure 3:
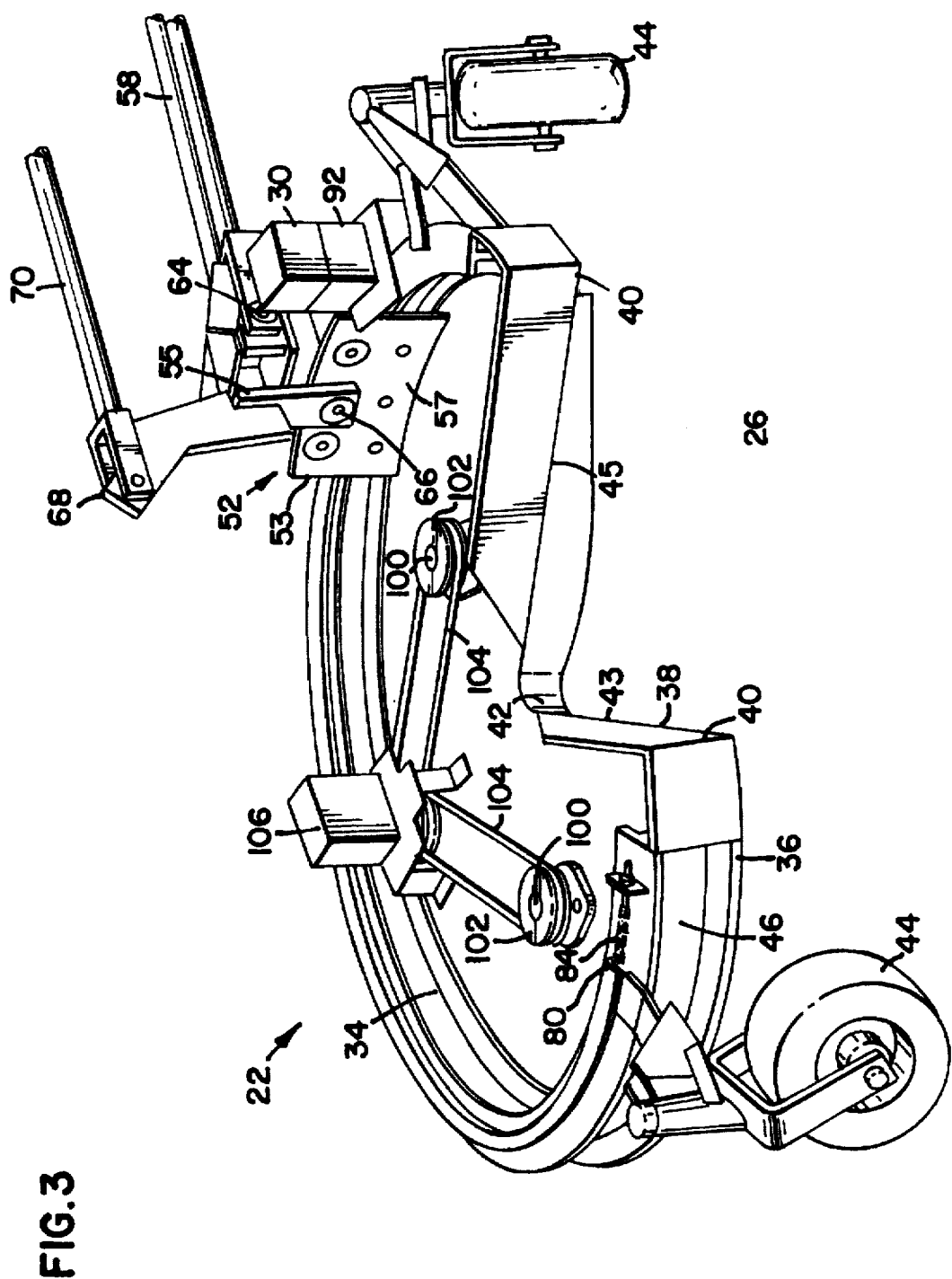
FIG. 3 is an enlarged perspective view of the implement carrier of FIGS. 1 and 2.

As shown in FIG. 3, a sidewall 36 preferably extends around the outer perimeter of the deck 34. An interior portion 38 of the sidewall 36 preferably defines the slot 26 of the implement carrier 22. The interior portion 38 of the sidewall 36 is preferably arranged such that the slot 26 has an open end 40 adjacent to the outer perimeter of the deck 34 and a closed end 42 that circumscribes the pivot axis 32 of the implement carrier 22. The closed end 42 of the slot 26 is inwardly offset a predetermined distance from the pivot axis 32 such that when an obstacle is adjacent to the closed end 42 of the slot 26, the center of the obstacle is generally aligned with the pivot axis 32 of the implement carrier 22 (as best shown in FIG. 7B). For example, for the deck 34 to pivot about a post having a diameter equal to x inches, it is preferred for there to be at least x/2 inches of clearance between the pivot axis 32 and the closed end 42 of the slot 26.

Although the slot 26 may be a variety of shapes, it is preferred for the slot 26 to be generally V-shaped such that the open end 40 of the slot 26 is wider than the closed end 42 of the slot 26. The interior portion 38 of the sidewall 36 preferably forms opposing first and second slot edges 43 and 45 which extend radially outward from the closed end 42 of the slot 26. The V-shape of the slot 26 facilitates receiving obstacles within the slot 26. Although the angle between the first and second edges 43 and 45 of the slot 26 may vary, it is preferred for the angle of the slot 26 to be generally in the range of 45–90 degrees.

The deck 34 of the implement carrier 22 also preferably includes a plurality of wheels, such as swivel casters 44, that are preferably connected to the sidewall 36 of the deck 34. The swivel casters 44 extend below the bottom of the deck 34 and function to guide the implement carrier 22 along the ground when the mower 20 is in use.

The implement carrier 22 also preferably includes structure for connecting the implement carrier 22 to a vehicle such as the tractor 24. The structure for connecting the implement carrier to the tractor 24 includes a circular guide rail 46 such as a steel I-beam that is bent in a circle. The guide rail 46 is preferably connected to the top of the deck 34 and extends generally from the first edge 43 of the slot 26 along the outer perimeter of the deck 34 to the second edge 45 of the slot 26. As shown by the cross-sectional view of FIG. 4, the guide rail 46 preferably defines an inwardly opening channel 48 and outwardly opening channel 50 and is preferably centered about the pivot axis 32 of the implement carrier 22.

Figure 4:
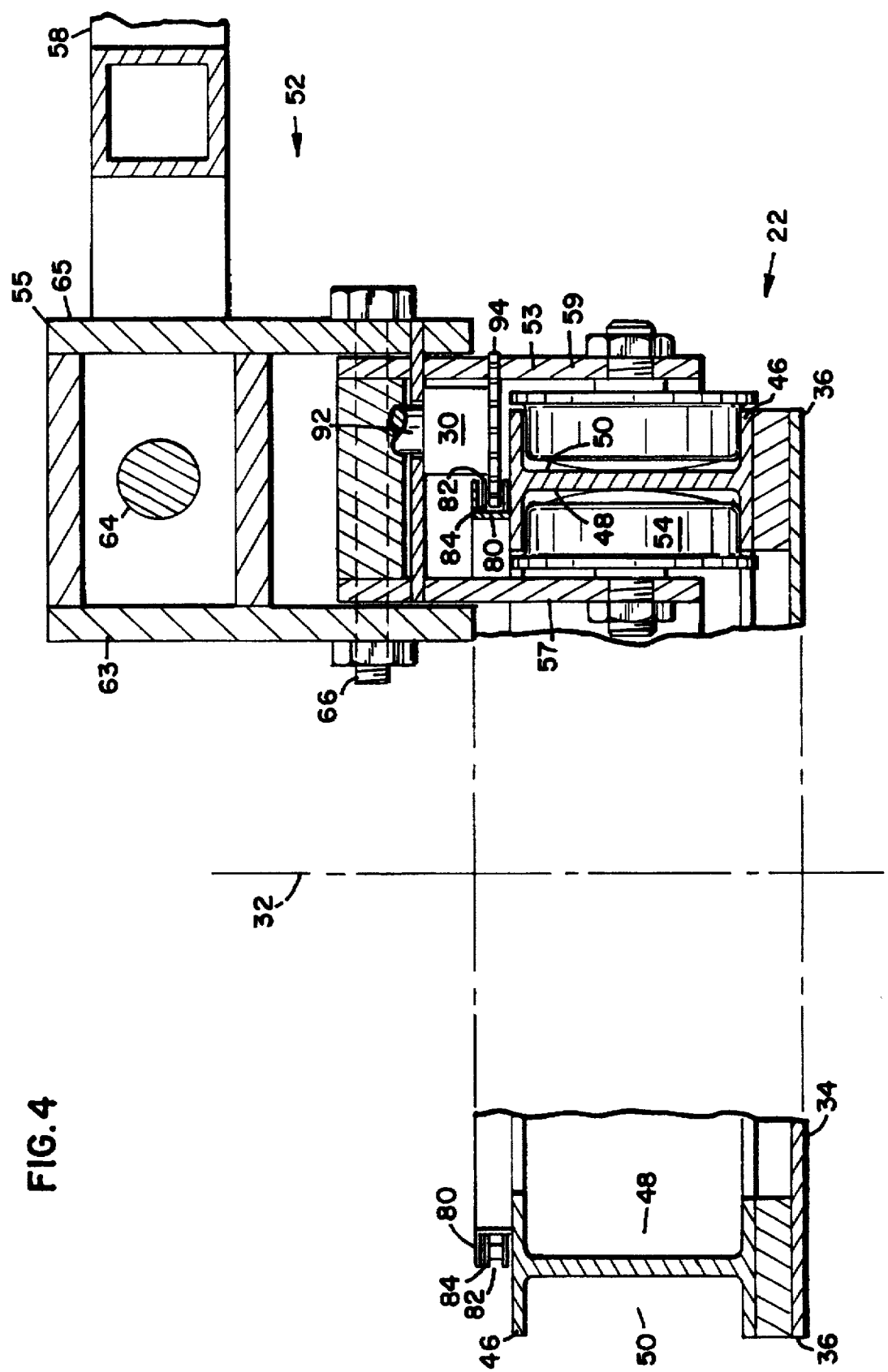
FIG. 4 is a cross-sectional view cut along a vertical plane extending generally across the diameter of the implement carrier of FIGS. 1 and 2, the cross-section illustrates a guide rail and mounting bracket assembly of the implement carrier.

The structure for connecting the implement carrier 22 to the tractor 24 also preferably includes a mounting bracket assembly 52 including a first bracket 53 pivotally connected to a second bracket 55. As shown in FIG. 4, the first bracket 53 preferably includes opposing first and second plates 57 and 59 that straddle the guide rail 46. A first set of idler pulleys 54 are preferably rotatedly connected to the first plate 57. The first set of idler pulleys 54 preferably includes three pulleys that are aligned side-by-side within the inwardly opening channel 48 of the guide rail 46 (as shown in FIG. 5). A second set of idler pulleys 56 are preferably rotatedly connected to the second plate 59. The second set of idler pulleys 56 preferably includes three pulleys that are aligned side-by-side within the outwardly opening channel 50 of the guide rail 46 (as shown in FIG. 5).

As best shown in FIGS. 4 and 5, the first set of idler pulleys 54 ride within the inner channel 48 of the guide rail 46 and the second set of idler pulleys 56 ride within the outer channel 50 of the guide rail 46 such that the web of the guide rail 46 is captured between the first and second sets of idler pulleys 54 and 56. The upper and lower flanges of the I-beam guide rail 46 prevent the sets of idler pulleys 54 and 56 from disengaging from the rail 46. When the deck 34 is pivoted, the guide rail 46 moves between the sets of pulleys 54 and 56. The first and second sets of pulleys 54 and 56 secure the deck 34 to the mounting bracket assembly 52 while concurrently allowing the deck 34 to pivot relative to the mounting bracket assembly 52.

Referring again to FIG. 4, the second bracket 55 of the mounting bracket assembly 52 preferably includes a pair of opposing flange members 63 and 65 that straddle the first and second plates 57 and 59 of the first bracket 53. The pair of opposing flange members 63 and 65 are pivotally connected to the first and second plates 57 and 59 of the first bracket 53 by a first generally horizontal pivot pin 66. The first pivot pin 66 is generally parallel to a longitudinal axis of a boom 58 that connects the bracket assembly 52 to the tractor 24. The pivot pin 66 allows the deck 34 to pivot generally about the longitudinal axis of the boom 58.

The boom 58 has a proximal end that is connected to the tractor 24 by conventional techniques. A distal end of the boom 58 is forked and preferably straddles the second bracket 55 of the mounting bracket assembly 52. The forked distal end of the boom is pivotally connected to the second bracket 55 of the mounting bracket assembly 52 by a second generally horizontal pivot pin 64 that is transversely aligned with respect to the longitudinal axis of the boom 58. The second pivot pin 64 allows the deck 34 to pivot in drawbridge-like fashion about the pivot pin 64.

The first and second pivot pins 64 and 66 together provide the implement carrier 22 with a full range of pivotal motion such that the implement carrier 22 is free to pivotally follow the contours of a ground surface.

The deck 34 of the implement carrier 22 is preferably pivotally moveable, in drawbridge fashion, about the second pivot pin 64 between an operating position (as shown in FIG. 1) and a stowed position (as shown in FIG. 2). A lever arm 68 extending generally perpendicularly outward from the second bracket 55 of the mounting bracket assembly 52 cooperates with a deployment arm 70 to move the deck 34 between the stowed and operating positions. The deployment arm 70 is preferably selectively pushed away from the tractor 24 and pulled toward the tractor 24 by a drive mechanism such as a hydraulic cylinder (not shown). When the deployment arm 70 is pushed away from the tractor 24, the implement carrier 22 pivots about the second pivot pin 64 from a stowed position (as shown in FIG. 2) to an operating position (as shown in FIG. 1). In contrast, when the deployment arm 70 is pulled toward the tractor 70, the implement carrier 22 pivots about the second pivot pin 64 in a drawbridge-type fashion from the operating position to the stowed position.

It will be appreciated that the hydraulic cylinder can be equipped with a restriction valve for insuring that the implement carrier 22 is smoothly moved between the stowed position and the operating position by the deployment arm 70 of the hydraulic cylinder.

Although the proximal end of the boom 58 can be connected to the tractor 24 by a variety of conventional techniques, it is preferred for the proximal end of the boom 58 to be pivotally connected to the tractor 24 such that when the implement carrier 22 is in the operating position, the boom 58 can swing about a vertical axis between forward and backward positions. One or more springs (not shown) can be used to bias the boom in the forward position. The pivot and spring arrangement facilitates operation of the implement carrier 22 by allowing the boom 58 to pivot backward when an obstacle is received in the slot 26 thereby dampening any impact that may occur between the closed end 42 of the slot 26 and the obstacle. After the implement carrier 22 has cleared the obstacle, the spring preferably returns the boom 58 to the forward position.

It is also preferred for the boom 58 to have a limited range of longitudinal movement for facilitating guiding obstacles into the slot 26. For example, the boom 58 can be slidingly connected, by conventional connecting techniques, to the tractor 24 such that the boom 58 is free to slide longitudinally inward or outward as an obstacle is received in the slot 26.

The above described boom mounting method allows the deck 34 of the implement carrier 22 to universally and freely move within a 2-dimensional, generally horizontal plane. The universal freedom of movement of the deck 34 helps an operator center obstacles on the pivot axis 32 and allows the deck 34 to pivot about an obstacle even if the obstacle is slightly misaligned with the pivot axis 32.

Although the implement carrier 22 of the present invention may include a variety of drive mechanisms for pivoting the implement carrier 22 about the pivot axis 32, a preferred drive mechanism includes a first motor 92, such as a hydraulic motor or combustion engine, that cooperates with a drive track to pivot the deck 34 about the pivot axis 32.

FIG. 6 shows a preferred drive track including a drive chain 84 supported by a chain mounting flange 80 that is welded to the top of the guide rail 46. As shown in FIG. 4, the mounting flange 80 preferably has an L-shaped cross-section and together with the top of the guide rail 46 defines an outwardly opening channel 82. It is preferred for the mounting flange 80 to be centered about the pivot axis 32 and to extend around the perimeter of the deck 34 generally from the first edge 43 of the slot 26 to the second edge 45 of the slot 26.

The channel 82 of the mounting flange 80 is sized to receive the drive chain 84. The drive chain 84 tightly extends around the perimeter of the mounting flange 80. To facilitate tightening the chain 84, one end of the chain is fixedly connected to the top of the guide rail 46 while the other end of the drive chain 84 is adjustably connected to the top of the guide rail 46. As shown in FIG. 6, a preferred method of adjustably connecting the end of the drive chain 84 to the top of the guide rail 46 includes a bolt 86 connected to the end of the drive chain 84 and extending through a flange 88 that is welded to the top of the guide rail 46. A nut 90 is threaded on the end of the bolt 86 extending through the flange 88. By threading the nut 90 along the bolt 86 and against the flange 88, the bolt 86 is pulled through the flange 88 such that the chain 84 is tightened against the mounting flange 80.

The first motor 92 preferably cooperates with the drive track through use of a gear 94 that is driven by the first drive motor 92. As shown in FIGS. 4 and 6, the drive gear 94 has teeth which engage the drive chain 84. As the drive gear 94 is rotated by the motor 92, the gear teeth cooperate with the links of the chain 84 to pivot the deck 34 of the implement carrier 22 about the pivot axis 32. For example, when the gear 94 is driven by the first motor 92 in a counterclockwise direction, the gear teeth engage the chain 84 to pivot the deck 34 clockwise about the pivot axis 32. Similarly, when the gear 94 is driven by the first motor 92 in a clockwise direction, the gear teeth engage the chain 84 to pivot the deck 34 counterclockwise about the pivot axis 32. As the deck 34 is pivoted about the pivot axis 32, the web of the guide rail 46 moves between the first and second sets of idler pulleys 54 and 56 such that the deck 34 is guided and stabilized.

Figure 7A:
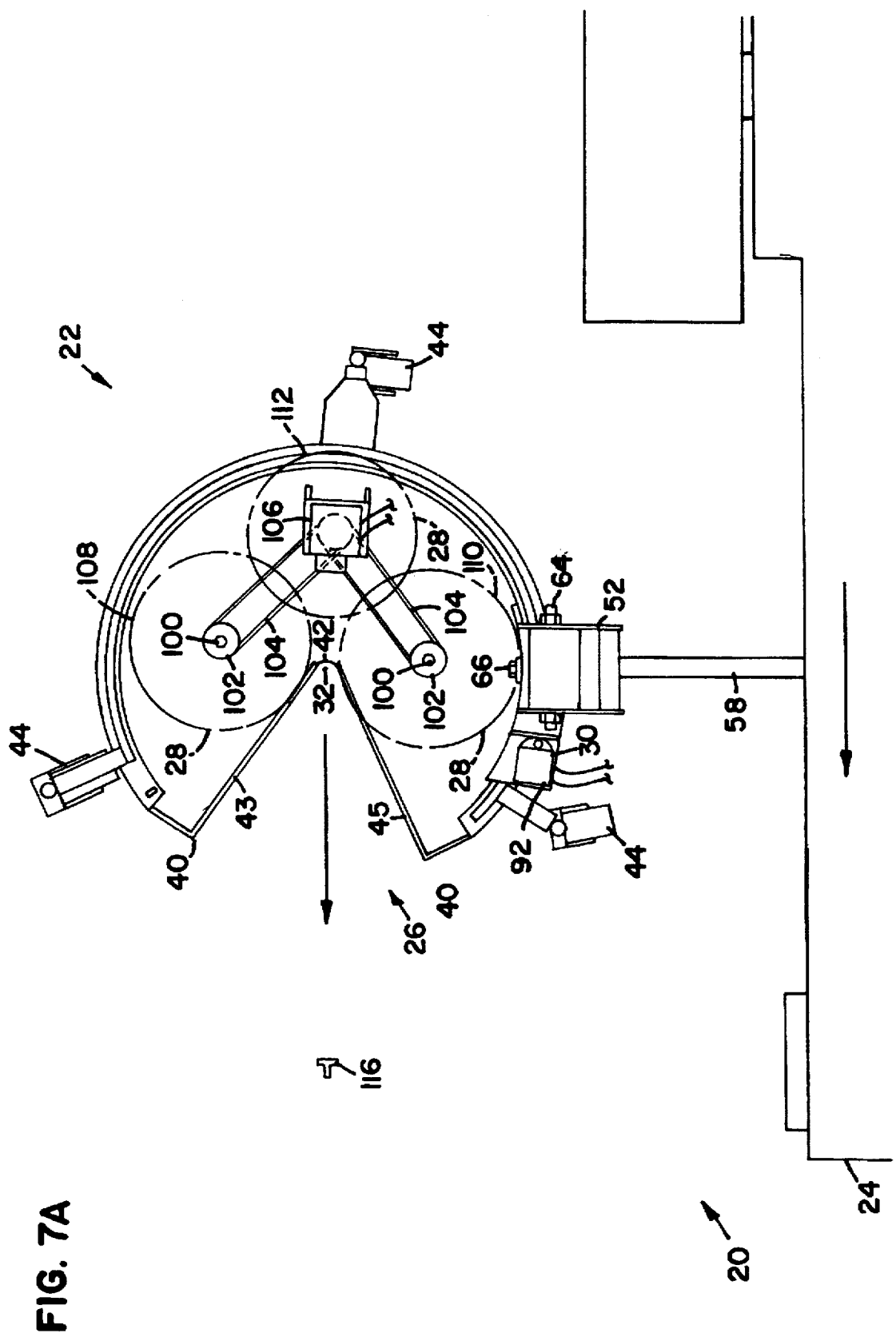
FIGS. 7A–7G provide a progression of schematic illustrations showing the implement carrier of FIGS. 1 and 2 in the process of bypassing an obstacle.
Figure 7B:
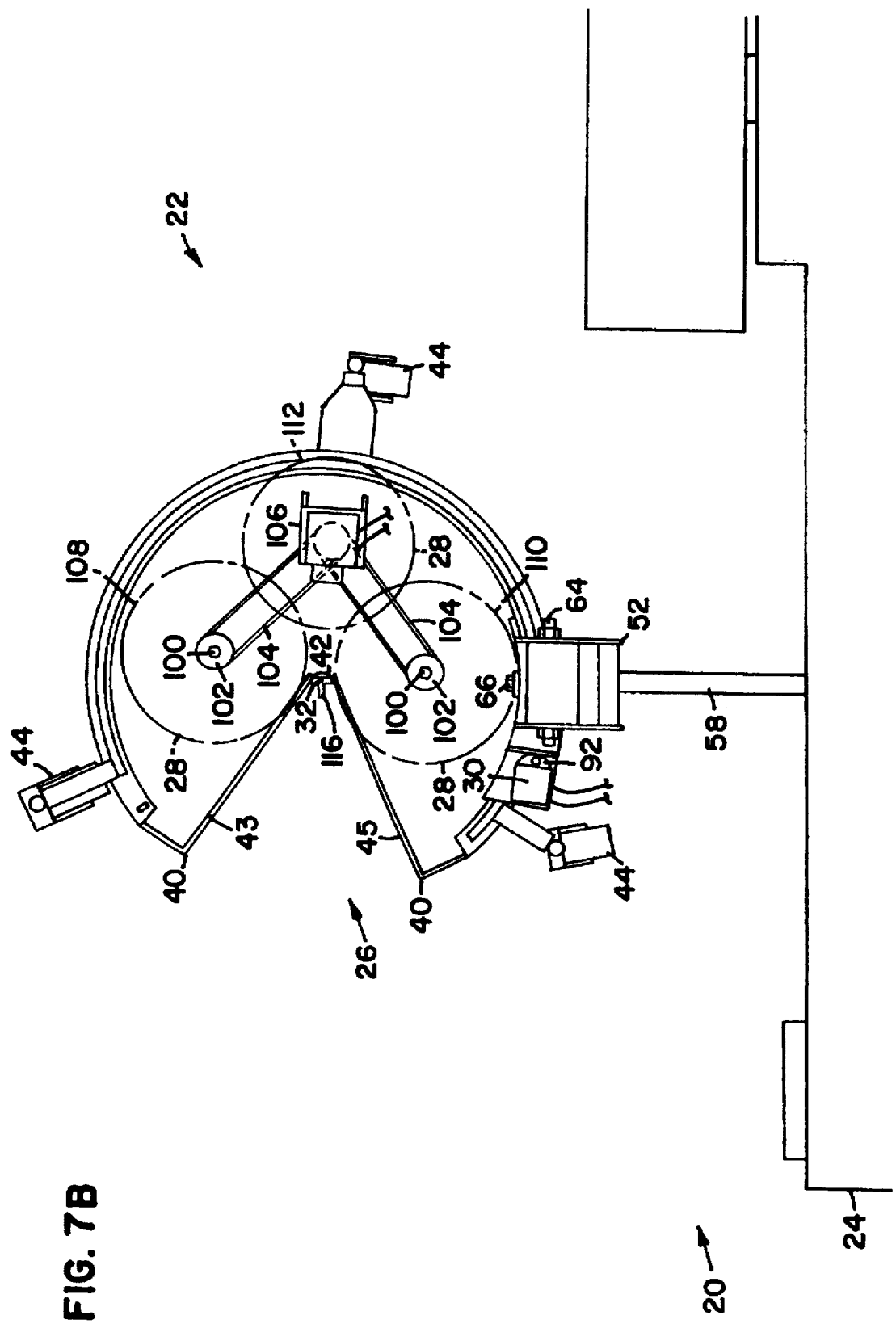
Figure 7C:
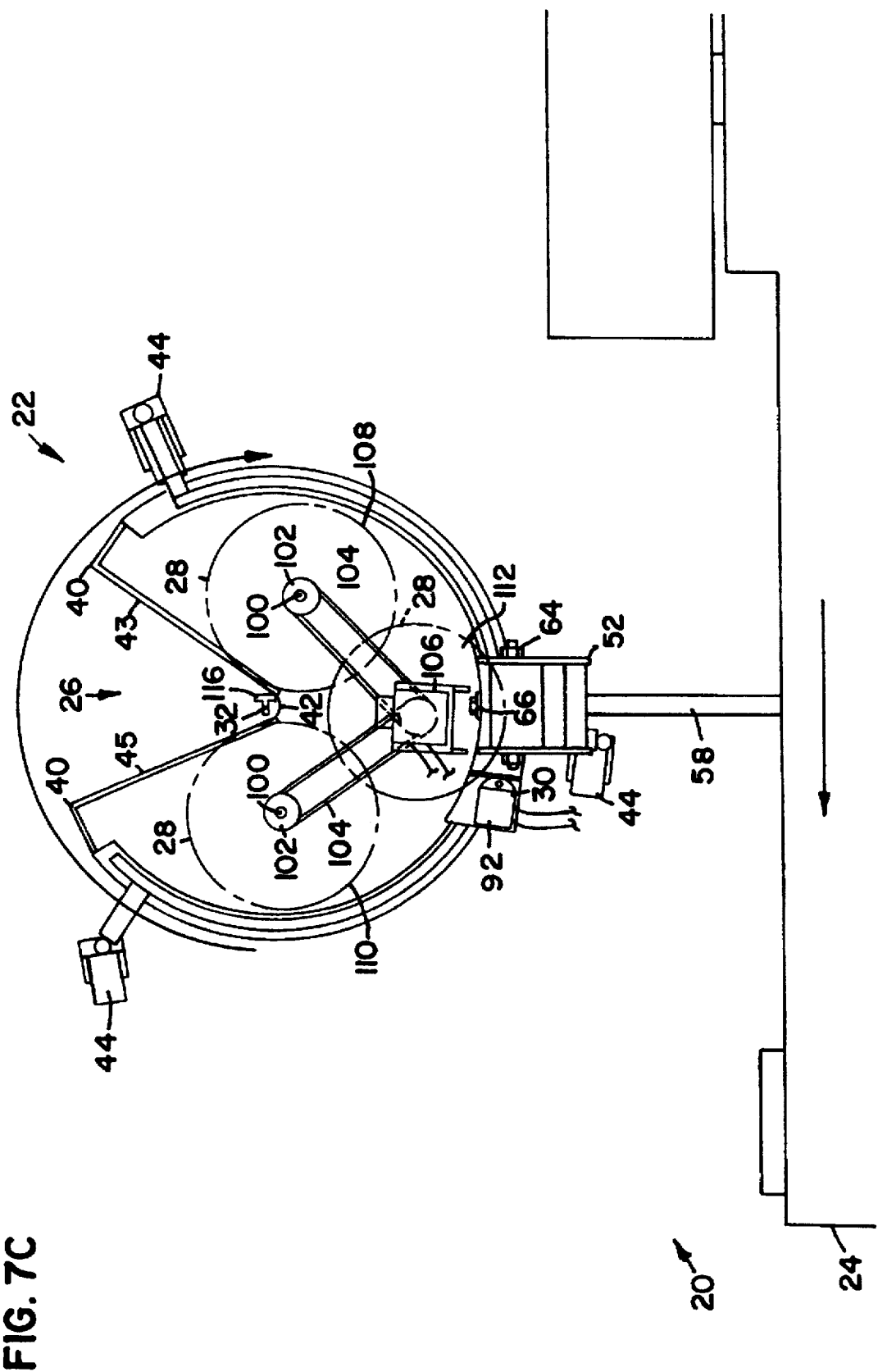
Figure 7D:
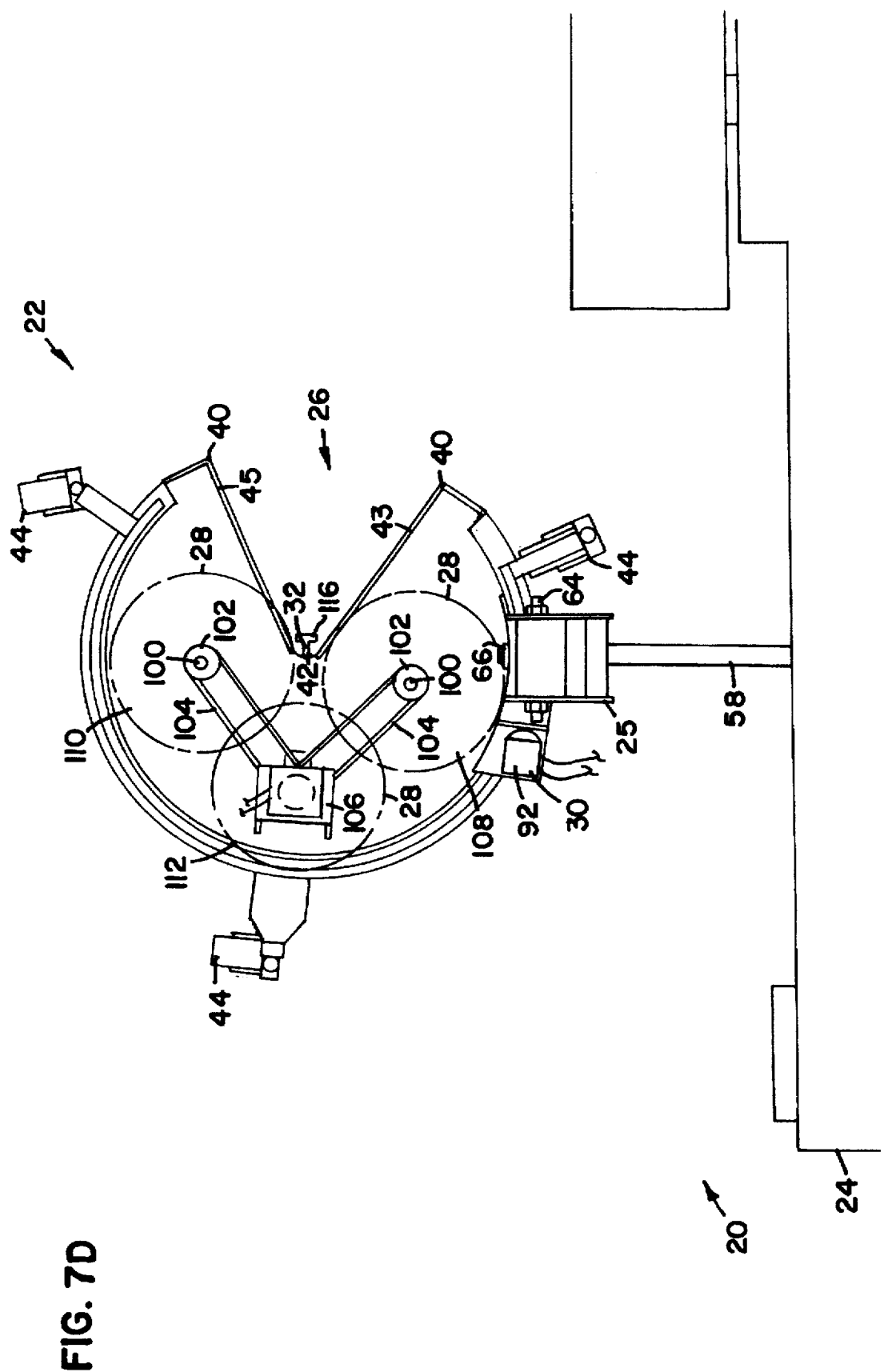

In normal operating conditions, it is preferred for the drive mechanism 30 to pivot the deck 34 180 degrees about the pivot axis 32 from a forward facing position (as shown in FIG. 7A) to a rearward facing position (as shown in FIG. 7D). However, it will be appreciated that it is not necessary for the deck 34 to rotate a complete 180 degrees. For example, it has been determined by the inventor that by varying the size and angle of the obstacle receiving slot, implement carriers of the present invention are operable even with as little as 130 degrees of rotation.

It will be appreciated that a variety of drive configurations may be employed to pivot the deck 34 of the implement carrier 22 about the pivot axis 32. For example, instead of using a drive chain 84, teeth may be cut directly into the mounting flange 80 for cooperating with the drive gear 94. Also, the drive track may include a plurality of inwardly facing teeth that cooperate with a drive motor that is mounted on the inside of the drive track. Additionally, the drive mechanism may include a pulley and cable assembly arranged around the perimeter of the deck 34 for pivoting the deck 34 about the pivot axis 32.

The mower blades 28 of the mower 20 are preferably mounted on shafts 100 which extend through holes defined by the deck 34. The shafts 100 are preferably mounted in conventional bearings which are preferably bolted to the top of the deck 34. Drive pulleys 102 are preferably connected to the tops of the shafts 100. The drive pulleys 102 are rotated by drive belts 104 that are driven by a second motor 106 such as a hydraulic motor or a combustion engine. The rotation of the drive pulleys 102 causes the mower blades 28 to rotate with a sufficient velocity such that the edges of the blades 28 effectively cut grass.

The mower blades 28 preferably include a first mower blade 108 and a second mower blade 110 that are spaced apart and aligned on generally opposite sides of the slot 26. The first and second mower blades 108 and 110 preferably have ends which pass in close proximity to the first and second edges 43 and 45, respectively, of the slot 26. Additionally, a third mower blade 112 is located generally between the first and second mower blades 108 and 110 and generally perpendicularly offset from the closed end 42 of the slot 26. It will be appreciated that the first, second and third mower blades 108, 110 and 112 have paths of travel which overlap (as shown in FIGS. 7A–7G) such that the mower uniformly cuts grass without leaving any tufts or stands of uncut grass around obstacles such as posts or small trees.

It will be appreciated that the mower 20 preferably also includes a safety shield extending around the perimeter of the deck 34 and along the edges of the slot 26 for preventing operators from being injured by the blades 28.

As previously described, the mower 20 of the present invention is used to effectively mow around obstacles such as trees, sign posts and fence posts without requiring an operator of the tractor 24 to change directions. In operation, the operator of the mower 20 lowers the implement carrier 22 from the stowed position to the operating position such that the deck 34 is generally parallel to the ground surface. The operator then starts the second drive motor such that the mower blades 108, 110 and 112 rotate with sufficient velocity to cut grass. The manner in which the implement carrier bypasses obstacles is illustrated by FIGS. 7A–7G. FIGS. 7A–7G progressively show the implement carrier 22 in the process of bypassing an obstacle.

When the carrier 22 is in the operating position, the implement carrier 22 is preferably oriented such that the slot 26 faces a first, generally forward direction as shown in FIG. 7A. With the slot 26 oriented in the forward direction, the operator forwardly advances the mower 20 toward an obstacle, such as a sign post 116, causing the post 116 to be received in the open end 40 of the slot 26. The operator continues to advance the mower 20 in the forward direction until the post 116 is aligned with the pivot axis 32 of the implement carrier 22 (as shown in FIG. 7B). Once the post 116 is aligned with the pivot axis 32, the operator initiates the second motor 92 such that the deck 34 pivots about the pivot axis 32. FIG. 7C shows the deck 34 in the process of being pivoted clockwise about the pivot axis 32. It is preferred for the deck 34 to pivot approximately 180 degrees about the pivot axis until the open end 40 of the slot 26 faces a second, generally rearward, direction (as shown in FIG. 7D). By pivoting the deck 34 about the pivot axis 32, the implement carrier 22 effectively mows around the post 116 without requiring the operator of the tractor 24 to alter the direction of the tractor 24.

Figure 7E:
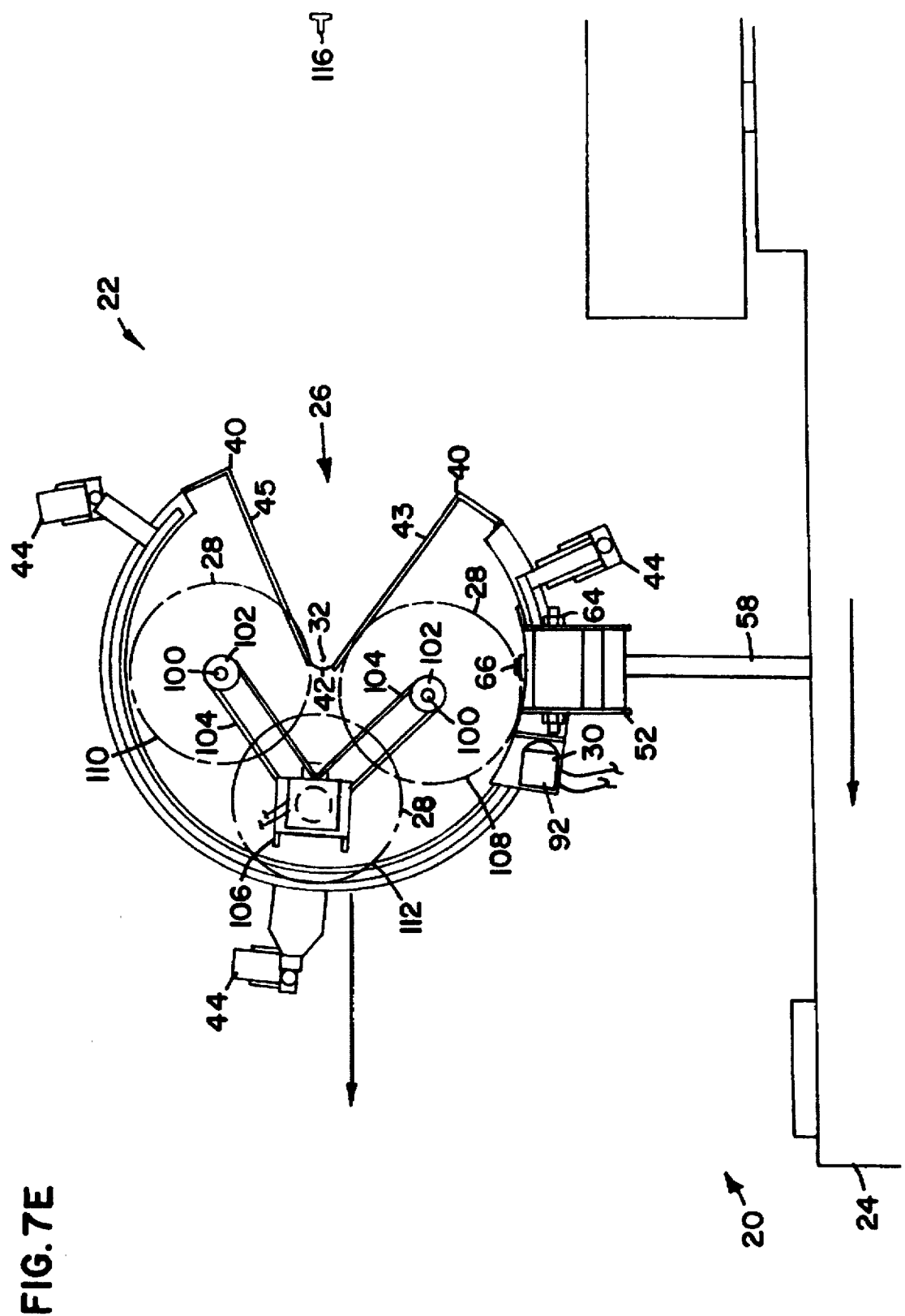
Figure 7F:
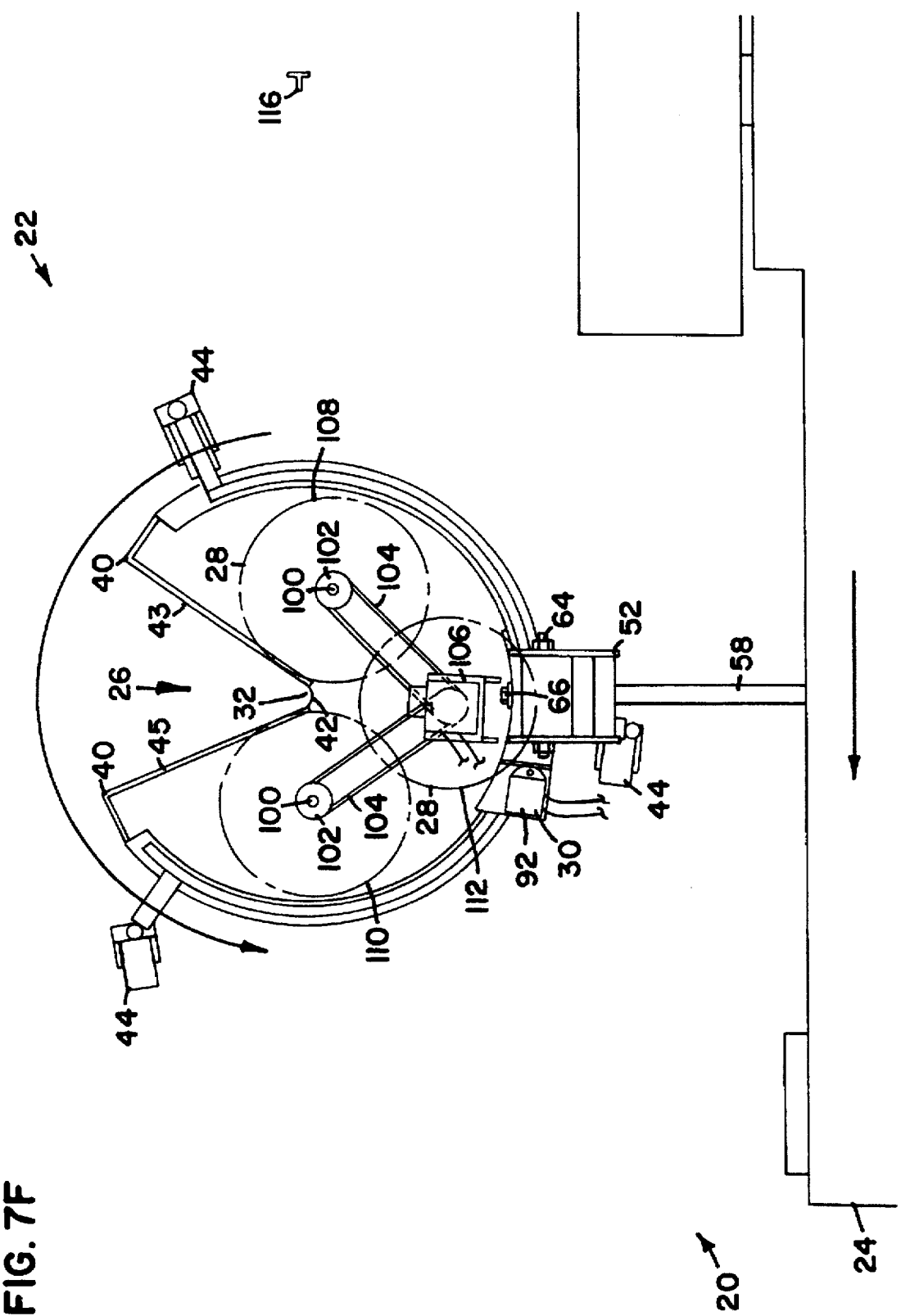
Figure 7G:
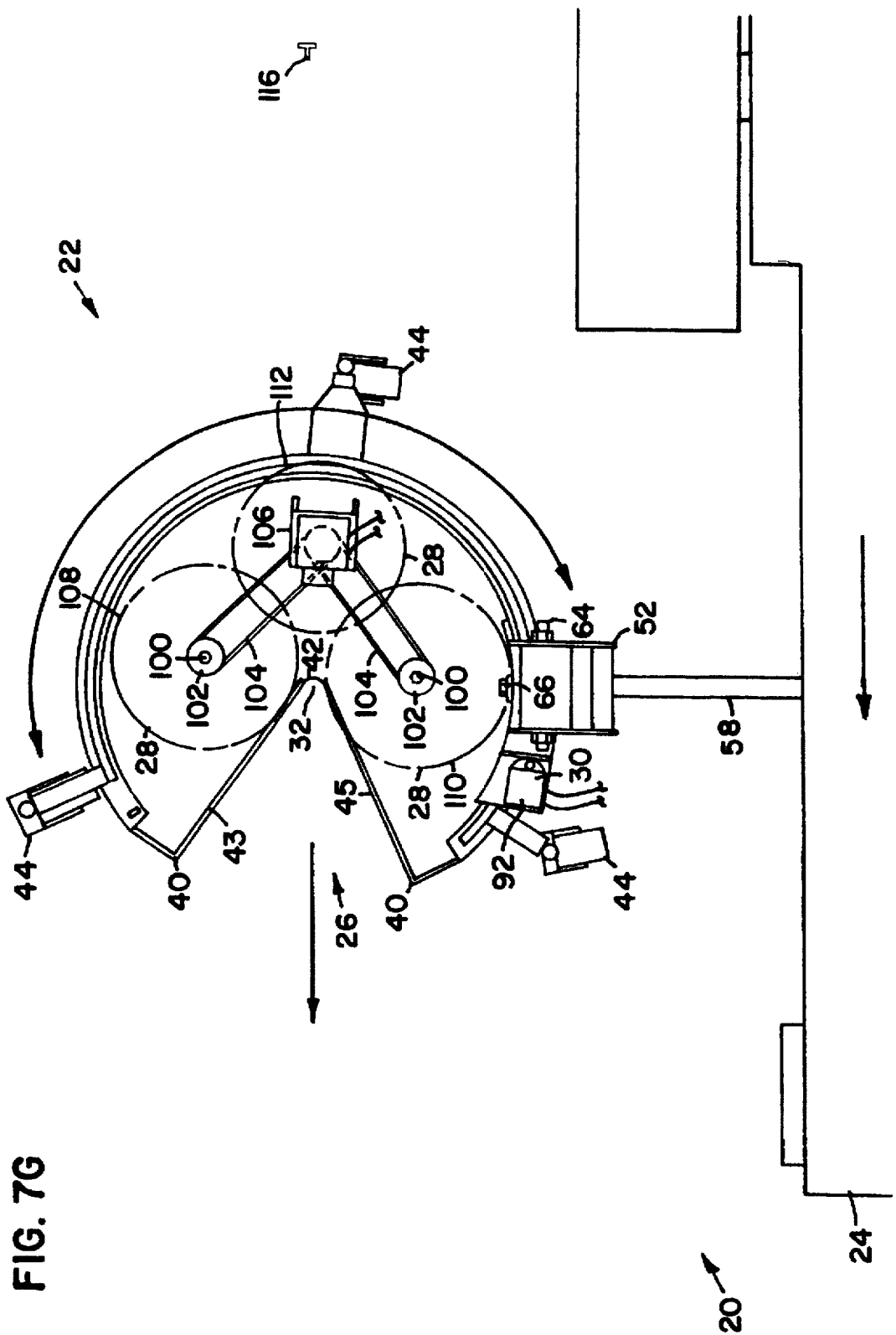

Once the deck 34 is oriented with the open end 40 of the slot 26 facing generally rearward, the operator advances the mower in the forward direction past the post 116 (as shown in FIG. 7E). When the implement carrier 22 is completely past the post 116, the operator initiates the motor 92 causing the deck 34 to pivot back about the pivot axis 32. FIG. 7E shows the deck 34 in the process of being pivoted counter-clockwise about the pivot axis 32 after having bypassed the post 116. It is preferred for the deck 34 to pivot approximately 180 degrees about the pivot axis until the open end 40 of the slot 26 faces in the forward direction (as shown in FIG. 7G). With the slot 26 facing in the forward direction, the slot 26 of the implement carrier 22 is oriented to receive additional obstacles. After completing mowing, the implement carrier 22 is preferably returned to the stowed position.

It will be appreciated that the implement carrier 22 of the present invention can be used to carry a variety of implements. For example, tiller blades may be mounted to the bottom of the implement carrier 22 for allowing an operator to till around obstacles such as small trees or posts. Similarly, sprayer nozzles or spreader blades may be mounted on the bottom of the implement carrier 22 for allowing an operator to efficiently spray or spread around obstacles.

It will also be appreciated that the implement carrier 22 of the present invention does not need to be belly mounted on a tractor. For example, the implement carrier 22 may be pulled on a trailer and offset behind a vehicle. Also, the implement carrier 22 may be mounted on an articulated boom. Furthermore, the implement carrier 22 may be front mounted on a vehicle and used to do spot work around obstacles by driving the vehicle toward the obstacle such that the obstacle is received in the slot 26 of the deck 34, pivoting the deck 34, and then backing away from the obstacle when the work is complete.

It will be appreciated that the present invention may include an implement carrier having a deck with a center mounted drive mechanism for rotating the deck 360 degrees about a pivot axis of the deck. Additionally, the implement carrier 22 may include a sensor located adjacent to the closed end 42 of the slot 26 for sensing when an object is aligned with the pivot axis 32 of the deck 34 and automatically pivoting the deck 34 about the obstacle.

With regard to the foregoing description, it is to be understood that changes may be made in detail, especially in matters of the construction materials employed and the shape, size, and arrangement of the parts without departing from the scope of the present invention. It is intended that the specification and depicted embodiment be considered exemplary only, with a true scope and spirit of the invention being indicated by the broad meaning of the following claims.

What is claimed is:

1. A mower comprising:

a vehicle;

a deck pivotal about a deck pivot axis that is generally perpendicular to the deck, the deck having a slot configured for receiving an obstacle, the deck pivot axis being oriented to pass through the slot of the deck;

a plurality of mower blades rotatably mounted on the deck;

structure for connecting the deck to the vehicle; and a drive motor for selectively pivoting the deck about the deck pivot axis, the drive motor being constructed and arranged to pivot the deck about the deck pivot axis while the vehicle remains substantially stationary, wherein when the obstacle is received in the slot and aligned generally with the deck pivot axis of the deck, the drive motor can be caused to pivot the deck about the obstacle thereby enabling the deck to mow around and by-pass the obstacle without requiring the vehicle to change directions.

2. The mower of claim 1, wherein the structure for connecting the deck to the vehicle comprises a boom connecting the deck to the vehicle, the boom being pivotally movable about a substantially vertical boom pivot axis such that the boom is free to pivot between forward and rearward orientations relative to the vehicle, wherein when the obstacle is received in the slot, the boom is free to pivot from the forward orientation to the rearward orientation to facilitate pivoting the deck about the deck pivot axis and to dampen impact forces resulting from contact between the obstacle and the deck.

3. The mower of claim 2, further comprising a plurality of wheels mounted on the deck for guiding the deck along a ground surface.

4. The mower of claim 3, wherein the boom is connected to the deck by a mounting bracket assembly, the mounting bracket assembly being constructed and arranged to allow the deck to pivot relative to the boom about multiple substantially horizontal contour adjustment axes, the contour adjustment axes allowing the deck to pivot in response to contour variations along the ground surface.

5. The mower of claim 4, wherein the contour adjustment axes include a first contour adjustment axis aligned generally transversely with respect to the boom, and a second contour adjustment axis aligned generally transversely with respect to the first contour adjustment axis.

6. The mower of claim 5, wherein the first contour adjustment axis allows the deck to pivot between an operating position and a stowed position.

7. The mower of claim 2, wherein the boom has a limited range of longitudinal movement such that the deck is free to move inward or outward as the obstacle is received in the slot.

8. The mower of claim 2, wherein the boom is connected to the deck by a roller assembly.

9. The mower of claim 8, wherein the deck includes a circular guide rail centered about the deck pivot axis, the guide rail defining an inner channel and an outer channel; and the roller assembly includes an inner curved mounting bracket including an inner set of rollers that ride within the inner channel of the guide rail, and an outer curved mounting bracket including an outer set of rollers that ride within the outer channel of the guide rail.

10. The mower of claim 9, wherein the guide rail has an I-shaped cross-section.

11. The implement carrier of claim 1, wherein the drive motor comprises a hydraulic motor for independently pivoting the deck about the deck pivot axis.

* * * * *